INVENTOR.
PAUL J. BERGER
BY
Cushman, Darby & Cushman
ATTORNEYS

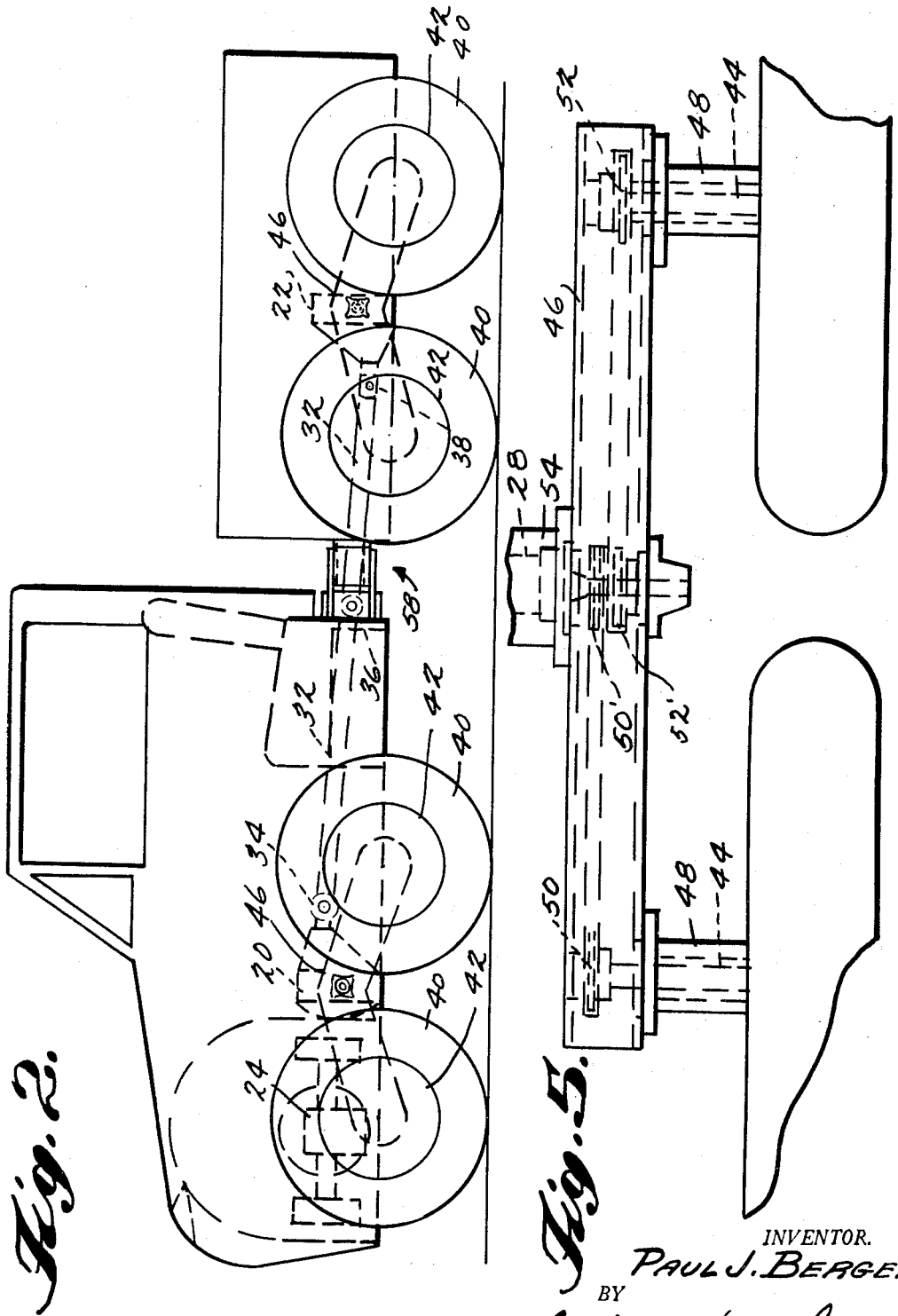

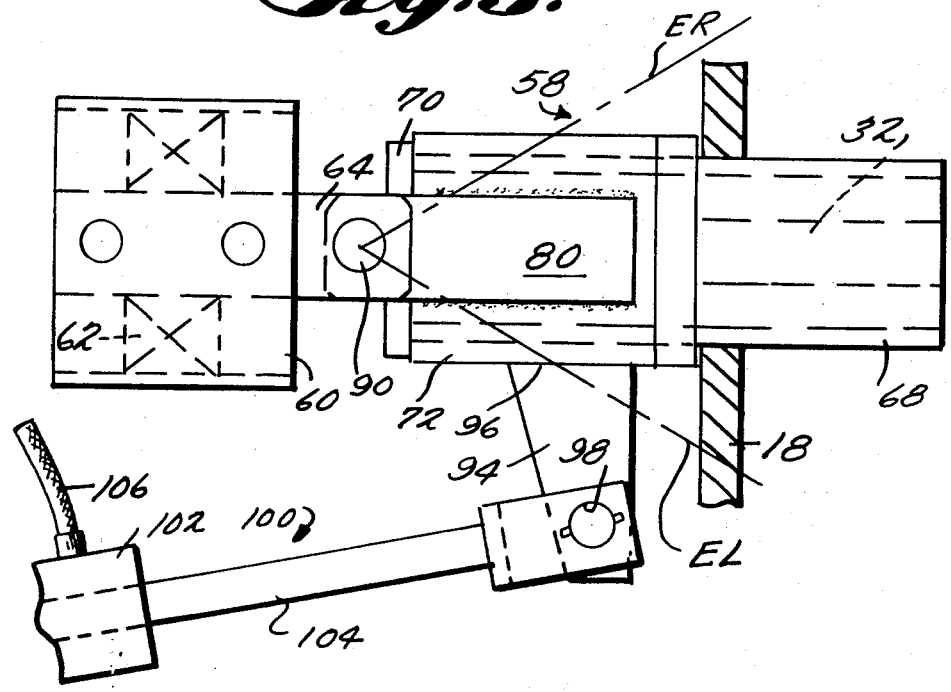
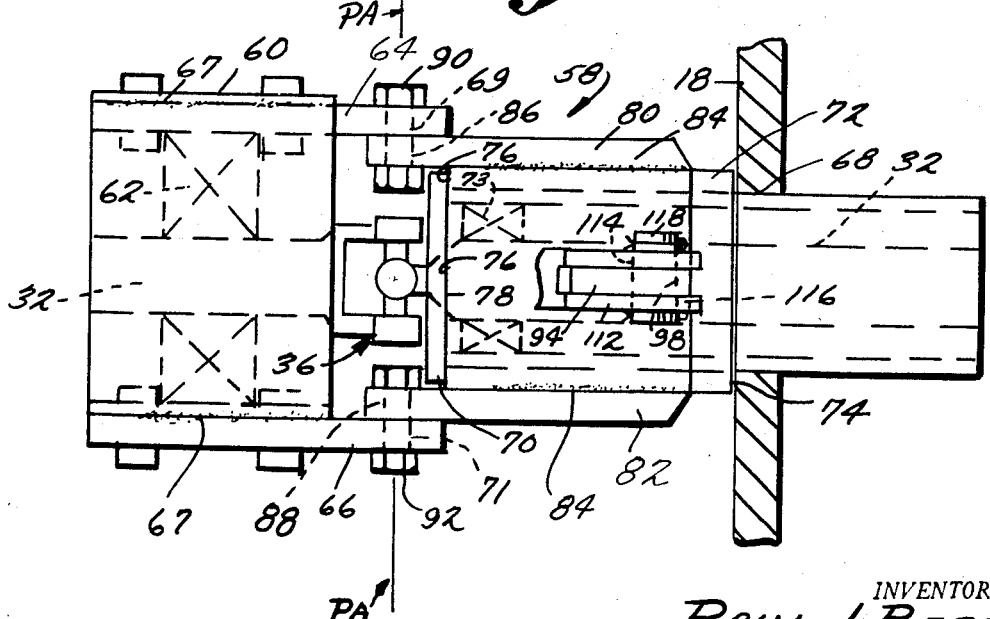

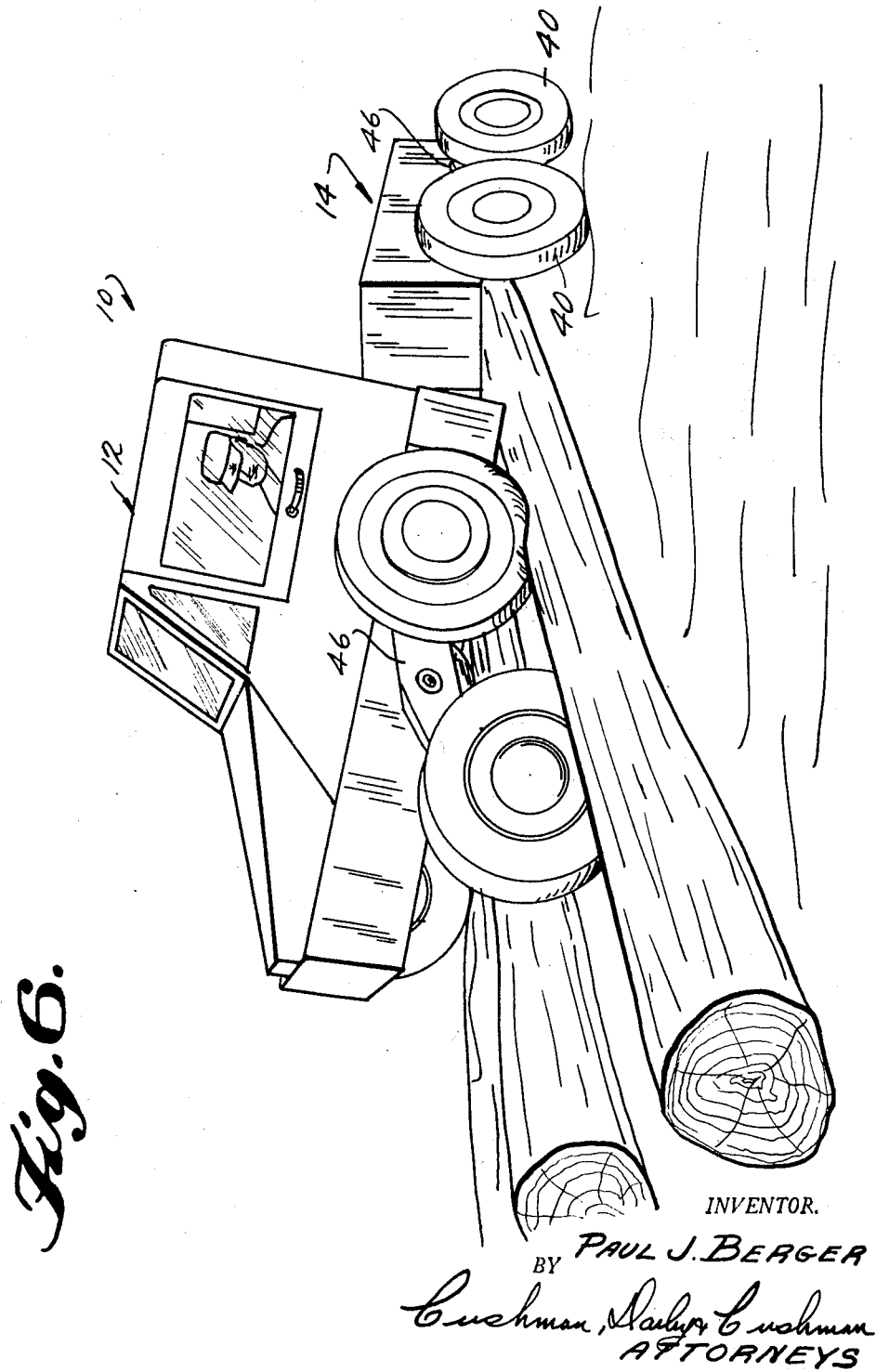

United States Patent Office 3,442,345
Patented May 6, 1969

3,442,345
ARTICULATED VEHICLE
Paul J. Berger, 2318 Pleasant, Missoula, Mont. 59801
Filed Feb. 6, 1967, Ser. No. 614,267
Int. Cl. B62d 13/00, 9/00
U.S. Cl. 180—23                                    5 Claims

ABSTRACT OF THE DISCLOSURE

An articulated vehicle is described having fore and aft wheeled portions joined by apparatus including a radially articulated steering yoke whose hydraulic jack works solely in a horizontal plane. The vehicle wheels are all mounted in driven relationship on full floating trunnions.

---

The present invention relates to vehicles and more particularly to articulated vehicles having floating trunnions. The vehicle of the invention is particularly well adapted for off-the-road use for instance in the cross-country maintenance of utility lines, forest service, fish and game department use and prairie and mountain use, even under difficult weather and terrain conditions such as mud, snow, and roughness. The vehicle includes a forward, cab portion and a rear, trailer portion each having full floating trunnions, all wheels being positively driven wheels, the forward and rear portions being connected by means including a radially articulated steering yoke.

It is an object of the invention to provide an off-the-road vehicle especially well suited to traversing rough terrain, having a radially articulated steering yoke and full floating trunnions so that it is effectively impossible to get a wheel off even rough ground other than by tipping the vehicle over.

Another object of the invention is the provision of improved steering means for land vehicles.

These and further objects of the present invention as well as the principles and scope of the invention will become more readily apparent during the course of the following detailed discussion, keyed from time to time to the preferred embodiments shown in the drawings.

In the drawings:

FIGURE 2 is a side elevation view of the vehicle of FIGURE 1;

FIGURE 3 is a top plan view, on an enlarged scale, of the steering yoke of the vehicle of FIGURES 1 and 2;

FIGURE 4 is a side elevation view of the steering yoke of FIGURE 3;

FIGURE 5 is a top plan view, on an enlarged scale of an example of the floating trunnions of the vehicle of FIGURES 1 and 2, parts being broken away to expose elements of interest; and FIGURE 6 is a reduced scale perspective view of a vehicle according to the present invention negotiating rough terrain.

Figure 1:
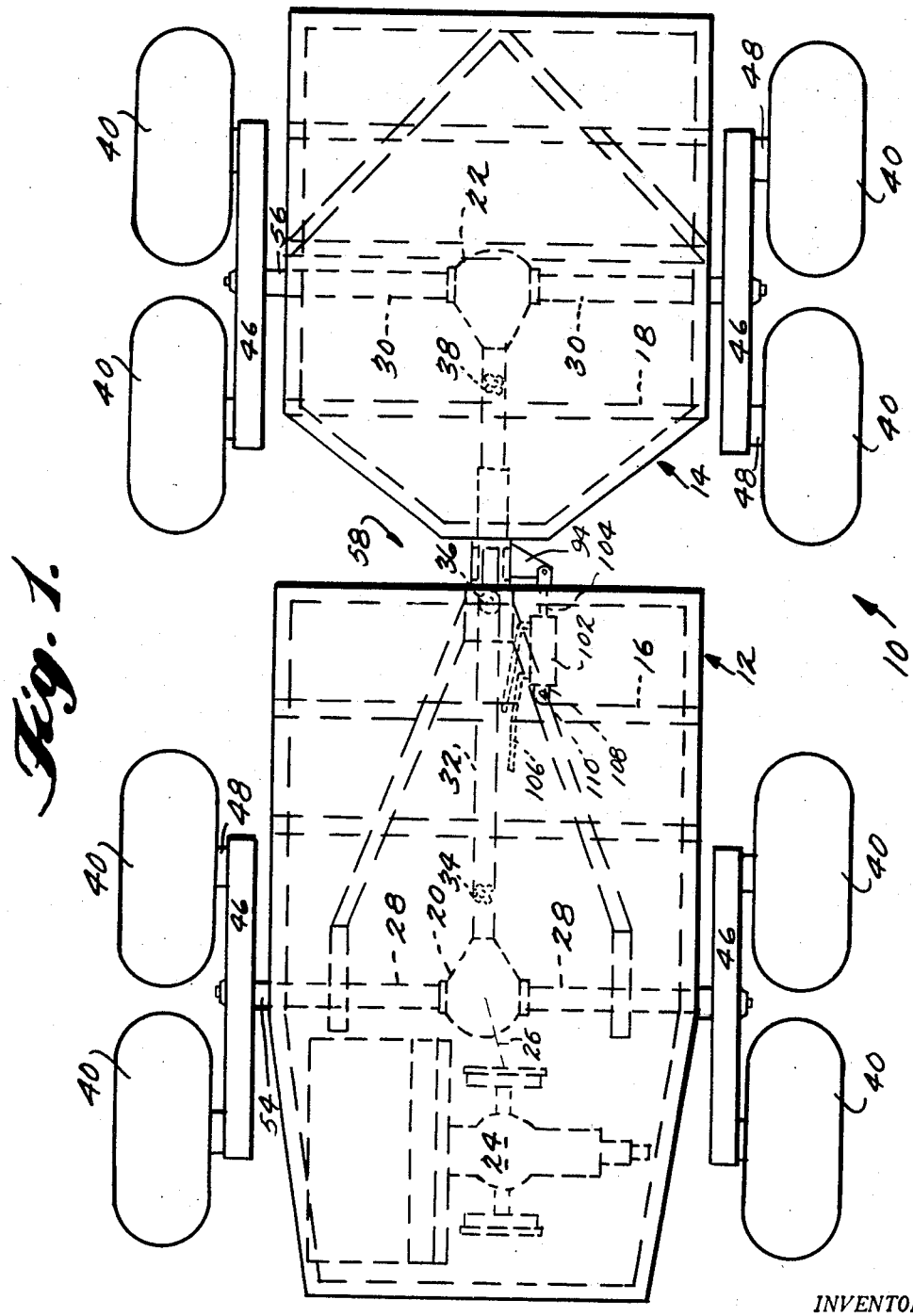
FIGURE 1 is a top plan view of vehicle according to the present invention, parts being broken away to expose elements of interest and some conventional elements being shown only in outline.

The vehicle 10 as shown generally comprises a cab or forward portion 12 and a trailer or rear portion 14. Both the forward and rear portions 12, 14 include frames 16, 18 intermediate the ends of which are mounted differentials 20, 22 along the respective frame centerline. The differentials 20, 22 in the vehicle as shown are of the conventional positive traction type which supply power to all driven wheels. A conventional gasoline engine 24 mounted on the vehicle forward portion frame 16 supplies power to the differential 20 through a conventional power train 26.

Each of the differentials 20, 22 is operatively connected to respective transverse axles 28, 30. A drive shaft 32 connects the rear differential 22 to the forward differential 20. The drive shaft 32 includes universal joints at 34 just behind the forward differential 20, at 36, in the hitch area between the forward and rear portions of the vehicle 10, and at 38 just forward of the rear differential.

Each of eight shown vehicle wheels 40 is mounted via conventional hub and drum assemblies 42 in fore and aft pairs on the stub shafts 44 of trucks or floating trunnions 46. The latter each include a two-armed housing which diverges downwardly and outwardly from a central apex, the shafts 44 each being journalled within tubular housing elements 48 that project laterally from the arm extremes. Within the housing, each shaft 44 is drivingly connected to its respective axle by means such as sprockets 50, 52 on the fore and aft shafts, sprockets 50′, 52′ on a protrusion of the respective axle into the respective housing at the central apex of the housing and endless drive chains entrained about each sprocket pair 50, 50′ and 52, 52′. The axles 28, 30 are mounted for rotation within tubular housing extensions 54, 56 that are fixed to the respective vehicle portion frames. When the vehicle 10 negotiates rough terrain, the trunnions rock as illustrated in FIGURE 6 to maintain all of the wheels in engagement with the ground. Especially for snow use, endless track laying elements, comprising filament reinforced rubber belts can be entrained about each pair of fore and aft tires and wheels.

The novel hitch and steering arrangement 58 includes a base 60 fixedly mounted on the vehicle forward portion centrally of the rear portion thereof. The base 60 is shown being generally rectangularly tubular about a horizontal axis aligned with the longitudinal axis of the vehicle forward portion and comprised of welded metal plates. The drive shaft is journalled by bearings 62 mounted within the base 60, just ahead of the universal joint 36. Upper and lower tongues 64, 66 project horizontally rearwardly a short distance from fixed mountings, for instance welding 67 on the upper and lower elements of the base 60. Near their rearmost free ends, the tongues 64, 66 each have a vertical opening 69, 71 formed therethrough in vertical alignment with one another and with the pivot axis of the universal joint 36.

The hitch 58 also includes a base 68 fixedly mounted on the vehicle rear portion centrally of the front thereof. The base 68 is shown being generally circularly tubular about a horizontal axis aligned with the longitudinal axis of the vehicle rear portion and including an integral radially outwardly directed circumferential flange 70 at the foremost end thereof. The base 68 contains bearings 73 which journal the drive shaft 32, just rearwardly of the universal joint 36. A tubular yoke or collar 72 is received about the base 68 so the rear end 74 thereof abuts the vehicle rear portion frame where the base 68 passes into the frame and so the forward end 76 thereof abuts the rear face 78 of the flange 70. It should be clear that a second flange, similar to the flange 70 could be provided on the base 68 for abutment with the rear end of the yoke 72 instead of abutment against the vehicle rear portion frame structure shown. The internal diameter of the yoke 72 is slightly greater than the external diameter of the main portion of the base 68 and the yoke 72, is slightly axially shorter than the distance between the members its ends have just been described as abutting so that lubricant such as grease can be received between the yoke, the base 68 and the abutment elements. Accordingly, the yoke 72 is freely rotatable about its own longitudinal axis on the base 68 while substantial axial movement thereof is prevented by the abutment elements.

It should now be noticed that upper and lower, diametrically opposed tongues 80, 82 project forwardly a short distance of the flange 70 from fixed mountings, for instance welding 84, on upper and lower diametrically opposed regions of the yoke 72. Near their foremost, free ends the tongues 80, 82 each have a vertical opening 86, 88 formed therethrough in vertical alignment with one another and with the pivot axis of the universal joint 36. A first nut and bolt assembly 90 received through the aligned openings 69, 86 of the overlapped tongues 64, 80 and a second nut and bolt assembly 92 received through the aligned openings 71, 88 of the overlapped tongues 66, 82 secure the vehicle forward portion 12 to the vehicle rear portion 14 and establish a pivot axis PA between them. Due to the angular rotatability of the yoke 72 on the base 68, the rear portion 14 can tip about its longitudinal axis with respect to the forward portion 12 of the vehicle 10; this being best illustrated by the relative attitude of the vehicle portions 12, 14 in FIGURE 6.

Intermediate the ends of the yoke 72, a fin-like arm 94 projects laterally, generally radially, outwardly a substantial distance from the tubular portion of the yoke. In the drawings, the arm 94 is seen as a metal plate welded at 96 to the exterior of the tubular portion of the yoke.

The arm 94 near its laterally outer, free end has an opening 98 formed vertically therethrough.

A hydraulic ram assembly 100 comprising a housing 102 and a ram 104 is shown included on the vehicle 10. The housing 102 is provided with hydraulic fluid lines 106 which lead to valve operators (not shown) near the vehicle operator's seat for selectively controllably extending and retracting the ram 104 with respect to the housing 102. The housing end opposite that through which the ram protrudes is provided with an ear 108 having an opening therethrough by which the housing 102 is pivotably pinned at 110 to the vehicle forward portion frame near the rear thereof, laterally offset from the longitudinal axis of the vehicle forward portion in the same sense as the lateral extension of the arm 94 from the yoke 72. The frame of the vehicle forward portion is sufficiently open about the envelop EL-ER of pivotability of the housing 102 to prevent interference with pivoting to the extent shown.

The outer end of the ram 104 terminates in a bifurcated fitting 112 having aligned vertical openings 114, 116 therethrough. The arm 94 outer end region is received in the bifurcation and a link pin 118 is received in the openings 114, 98, 116 to pivotally key the ram outer end to the yoke arm 94.

Accordingly, while the vehicle 10 is in motion, if the vehicle operator retracts the ram from an intermediate condition, the latter acting through the steering yoke will cause the vehicle to assume an orientation for executing a left turn when the vehicle operator extends the ram past the intermediate condition the vehicle assumes a right-turning orientation. The sharpness of turning is controlled by the amount of fluid sent to the hydraulic ram housing by the vehicle operator using the aforementioned valve controls. It should be appreciated that the steering functions just outlined can take place regardless of the roughness of terrain which the vehicle is traversing.

It should also be apparent that the vehicle just described accomplishes each of the objects outlined at the beginning of this specification and clearly illustrates the principles of the invention.

I claim:

1. In an articulated vehicle having forward and rear frames, including a rear end on the forward frame facing a front end on the rear frame; ground engaging rotatable elements on each frame; an engine mounted on one of the frames; power transmission elements drivingly connecting the engine and the ground engaging elements on both of the frames; the power transmission elements including a drive shaft having a universal joint interposed therein between the rear and forward end of said forward and rear frames, respectively, the improvement comprising: a first tubular base fixedly, centrally mounted on the rear end of the forward frame surrounding said drive shaft ahead of said universal joint; a second tubular base fixedly, centrally mounted on the front end of the rear frame surrounding said drive shaft rearwardly of said universal joint; first and second bearing means mounted on the first and second tubular bases, respectively journalling said drive shaft ahead of and rearwardly of said universal joint; a tubular yoke rotatably, coaxially received on one of said tubular bases; means axially retaining said tubular yoke on said one tubular base; first tongue means fixedly mounted on the other of said first and second tubular bases and extending therefrom to vertical alignment with universal joint; second tongue means fixedly mounted on the tubular yoke and extending therefrom to a vertical alignment with the universal joint; and means pivotally securing the first tongue means to the second tongue means for relative pivotal movement about a pivot axis passing through said pivotally securing means.

2. The articulated vehicle of claim 1 further comprising an arm fixedly secured to said tubular yoke and extending generally horizontally, from said tubular yoke, terminating in a free end; elongated extensible-contractile ram means mounted on the frame which mounts said other tubular base by one end of said ram means for pivotal movement about a generally vertical axis substantially laterally offset from the longitudinal axis of the vehicle forward frame near the rear end of said forward frame; means pivotally connecting the opposite end of said ram means to said arm adjacent the outer free end of said arm for relative pivoting about a generally vertical axis; and control means for extending and contracting said ram for steering said vehicle.

3. The articulated vehicle of claim 2 wherein the elongated extensible-contractile ram means comprises a hydraulic ram unit including a housing and a ram slidingly received in and protruding from said housing; and fluid lines operatively connected to said housing for extending and retracting said ram.

4. An articulated vehicle comprising a vehicle forward portion having a first frame; a vehicle rear portion having a second frame and a hitch connecting said first and second frames, said hitch including first cylindrical element fixedly mounted on the first frame and extending rearwardly from the central-rear of said vehicle forward portion and having tongue means thereon extending rearwardly thereof, a generally cylindrical element fixedly mounted on the second frame in alignment with the longitudinal centerline thereof and extending forwardly from the central-front of said vehicle rear portion, a tubular yoke received circumferentially about said generally cylindrical element for angular rotation thereon, means on said generally cylindrical element cooperable with said tubular yoke to prevent substantial axial movement of said tubular yoke with respect to said generally cylindrical element, second tongue means fixedly mounted on the tubular yoke and extending axially forwardly therefrom; and means pivotally securing the first tongue means to the second tongue means for relative pivotal movement about a pivot axis passing through said pivotally securing means; the articulated vehicle further comprising an arm fixedly secured to said tubular yoke and extending laterally generally horizontally, from said tubular yoke, terminating in a free end; elongated extensible-contractile ram means mounted on said frame by one end thereof for pivotal movement about a generally vertical axis substantially laterally offset from the longitudinal axis of the vehicle forward portion near the rear of said first frame; means pivotally connecting the opposite end of said ram means to said arm adjacent the outer free end of said arm for relative pivoting about a generally vertical axis; and control means for extending and contracting said ram for steering said vehicle; transverse axle means on each of said vehicle frames; a positive traction differential interposed in each axle means generally centrally thereof; ground engaging wheel means mounted on each axle means at the laterally outer termini thereof; a drive shaft operatively connecting the differentials and supported in bearing means secured in each of said cylindrical elements; said drive shaft having a universal joint interposed therein in axial alignment with said pivot axis of said pivotally securing means; a motor mounted on one of said vehicle frames; and drive train means operatively drivingly connecting said motor and the differential on said one vehicle frame.

5. The articulated vehicle of claim 4 wherein each of said axles terminates at each laterally outer end thereof in a floating trunnion having a fore and an aft ground engaging wheel mounted thereon via individual stub axles; and means on each floating trunnion driving each stub axle from the respective axle laterally outer end.

References Cited

UNITED STATES PATENTS

| | | |
|---|---|---|
| 2,219,533 | 10/1940 | Ross. |
| 2,835,397 | 5/1958 | Wagner. |
| 3,007,590 | 11/1961 | Matthew et al. _____ 180—51 X |
| 3,253,671 | 5/1966 | Fielding _____ 180—51 |

A. HARRY LEVY, *Primary Examiner.*

U.S. Cl. X.R.

180—14, 51